United States Patent [19]
Allen

[11] 4,211,286
[45] Jul. 8, 1980

[54] REVERSIBLE DISC PLOUGH

[76] Inventor: William S. Allen, Tinaroo Falls Dam Rd., Kairi, Queensland 4872, Australia

[21] Appl. No.: 930,795

[22] Filed: Aug. 3, 1978

[30] Foreign Application Priority Data

Aug. 11, 1977 [AU] Australia .................. PD1197

[51] Int. Cl.² .................. A01B 3/16; A01B 3/40
[52] U.S. Cl. .................. 172/222; 172/212; 172/278; 280/488
[58] Field of Search .......... 172/212, 222, 450, 219, 172/278; 280/488

[56] References Cited
U.S. PATENT DOCUMENTS

| 734,055 | 7/1903 | Gardiner | 280/488 |
|---|---|---|---|
| 2,672,801 | 3/1954 | Barrett | 172/212 X |
| 2,780,158 | 2/1957 | Pursche | 172/222 |
| 4,037,856 | 7/1977 | Medlin et al. | 280/488 |

*Primary Examiner*—George J. Marlo
*Attorney, Agent, or Firm*—Schwartz, Jeffery, Schwaab, Mack, Blumenthal & Koch

[57] ABSTRACT

A reversible multi-disc plow has its main frame, to which the plow beam is pivoted, connected in front by a vertical pivot to a mounting frame which made for connection to the three point lifting system of a tractor. The pivotal movement of the main frame relative to the mounting frame is resisted by a spring loaded pivot box. If, during plowing, a disc strikes an obstacle, the plow main frame will pivot against the spring-loading to reduce stress on the plow and its parts.

4 Claims, 3 Drawing Figures

REVERSIBLE DISC PLOUGH

BACKGROUND OF THE INVENTION

This invention relates to a reversible disc plow.

Various kinds of reversible disc plows are well known, a typical plow of this type having a more or less horizontal main frame which is rigidly secured at the front to an upright front frame, made for connection to the three-point suspension gear of a tractor, a beam, pivoted under the main frame, being capable of being oscillated by a hydraulic cylinder to either normal or reversed position, inclining, in one direction or the other, to the direction of travel. Agricultural discs are carried by droppers or hangers pivoted about vertical axes to the beam, the angle of breast cut being adjustable, and the hangers being automatically pivoted as the beam is swung to normal or reversed position, a rear or furrow wheel mounted behind the beam also being automatically brought to properly aligned position when the beam is swung in one direction or the other.

Although reversible disc plows of this character have many advantages in a number of different plowing conditions, certain disadvantages have been found in such implements previously made. If the plow is being used in ground which includes large stones, stumps or other obstructions, very considerable shocks and stresses may be applied to the plow frame and other parts, and to the tractor and its three-point linkage, when a disc strikes such an obstacle, this being particularly so when the plow is fairly large and drawn by a powerful tractor. Another disadvantage is found in the mounting of the rear or furrow wheel, the moving parts of which are liable to undue wear and/or distortion in use under severe conditions. For example, if a powerful tractor drawing the plow should be turned sharply when the rear wheel is in the soil, it or its mounting are likely to be seriously damaged.

The present invention has been devised with the general object of overcoming or very greatly reducing these disadvantages, by providing a reversible multi-disc plow for attachment to the three-point linkage system of a tractor, wherein shocks and stresses occurring when a disc strikes an obstacle are very materially reduced, and in which the mounting for the rear or furrow wheel is particularly sturdy and trouble-free in operation.

SUMMARY OF THE INVENTION

With the foregoing and other objects in view, the invention resides broadly in a reversible multi-disc plow of the type having a main frame, mounting means for connecting the main frame, at its front, to the three-point lifting gear of a tractor, a beam pivoted to the main frame about a substantially vertical axis, means for swinging the beam to right and left hand plowing positions, a rear or furrow wheel at the rear of the beam, a number of hangers for plow discs pivoted about substantially vertical axes to the beam, and means for simultaneously pivoting the hangers automatically, relative to the beam, when the beam is swung to either of its two working positions; wherein the main frame is connected to the mounting means pivotally about a substantially vertical axis and spring-loading means are provided to resist pivotal movement of the main frame. Preferably the rear or furrow wheel is rotatable in a back wheel carrier frame pivoted about a substantially vertical axis to the beam near its rear end the rear end of the beam being laterally slidably engaged with guide members of the back wheel carrier frame, means being provided for maintaining the back wheel carrier frame in parallelism as the beam is swung to either of its workinhg positions. Other features of the invention will become apparent from the following description.

BRIEF DESCRIPTION OF THE DRAWINGS

A preferred embodiment of the invention is shown in the accompanying drawings wherein.

DESCRIPTION OF THE PREFERRED EMBODIMENT

Figure 1:
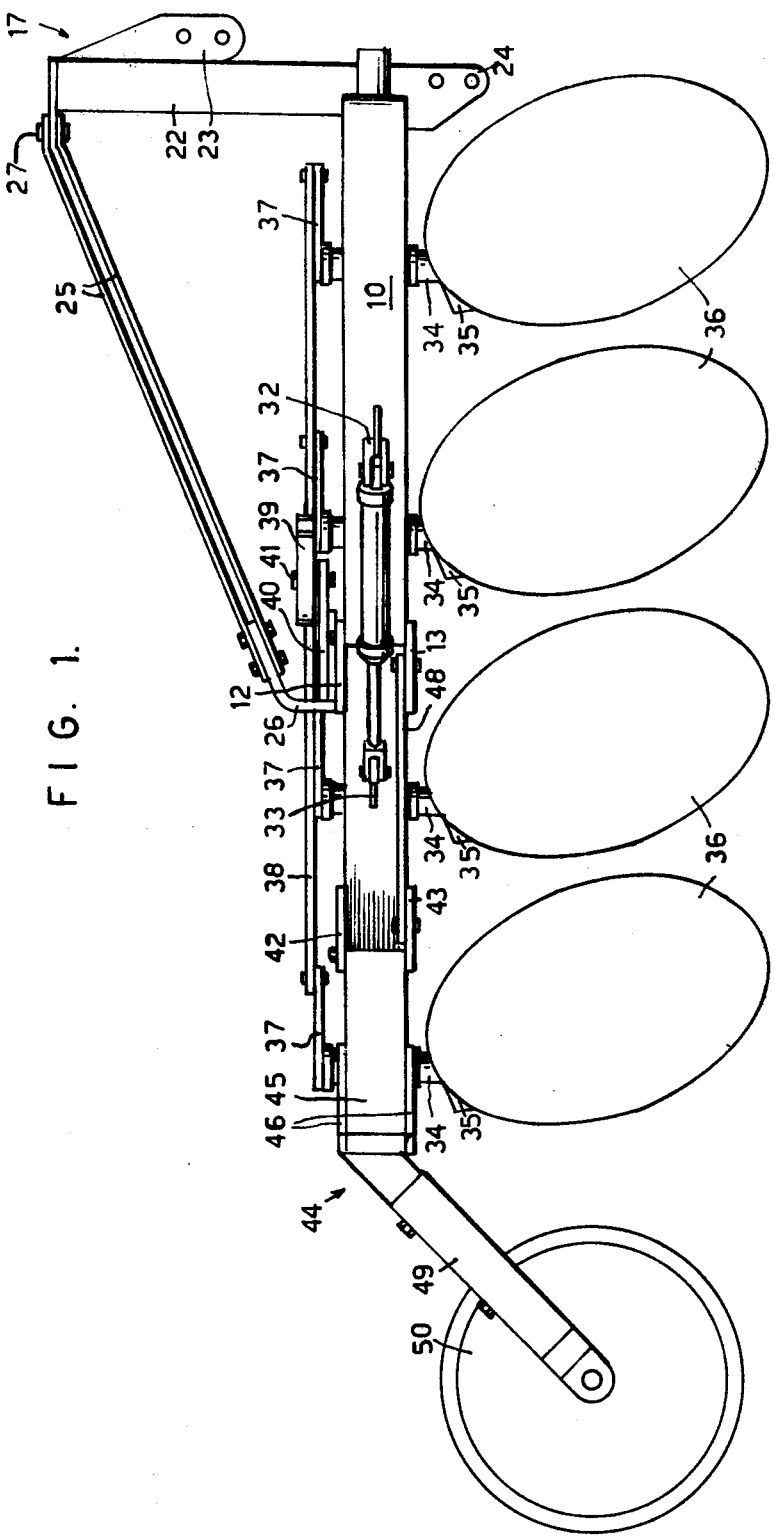
FIG. 1 is a side elevational view of a plow according to the invention.

The plow illustrated includes a main frame having a pair of side members 10 welded at their front ends to the sides of a transverse front pivot bar 11. The side members 10 are rearwardly convergent and rigidly secured, at their rear ends, between a pair of similar upper and lower beam pivot plates 12 and 13 respectively, the side members being welded to the lower plate 13 and bolted to the upper plate 12. The main frame also includes a transverse arc 15, welded at its ends to the side members 10 and with its middle part rigidly connected to that of the front pivot bar 11 by a connecting piece 16.

The main frame may be connected to the three-point lifting gear of a tractor by means of a mounting frame 17, including a box-section pivot box 18 in which the main frame front pivot bar 11, except for its ends, is housed, the connecting piece 16 passing through an oversize hole 16a in the rear of the pivot box. The main frame is ocillatable about a main frame pivot 19 passing through the pivot box 18 and a central hole through the main frame front pivot bar 11. Oscillation of the main frame is, however, resisted by front and rear helical compression springs 20 with their outer parts in housings 21 to the front and rear of the pivot box 18, their inner ends bearing against the front pivot bar 11.

The mounting frame 17 includes an A-frame 22 extending upwardly from the box-section member 18. A pair of apertured lugs 23 extending forwardly from the A-frame, and two pairs of apertured lugs 24 extending down from the box-section member, may be connected to the lifting and stabilizer arms of a tractor's three-point lifting system.

Figure 2:
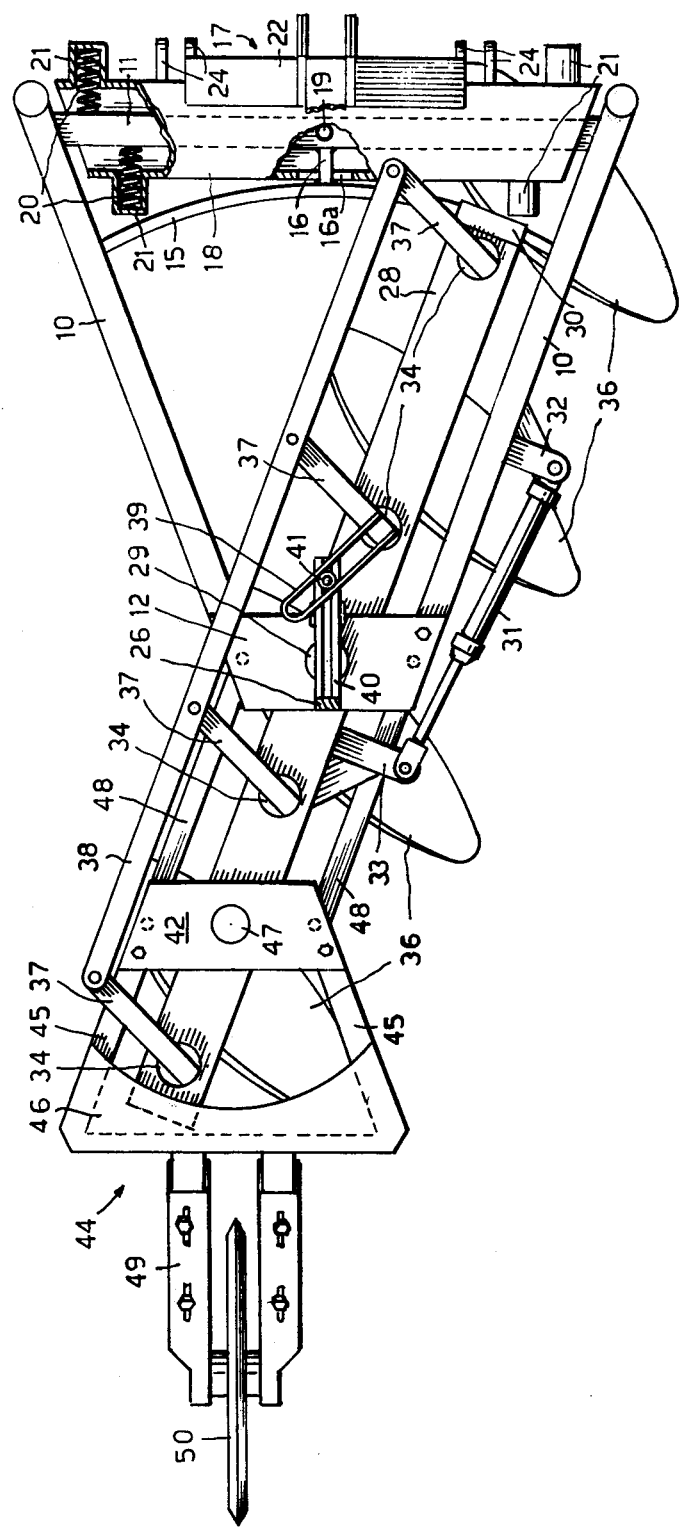
FIG. 2 is a plan view of the plow some parts being broken away for clarity.

A double oblique stay 25 (omitted from FIG. 2) is bolted at its rear to a bracket 26 on the upper beam pivot plate 12, and its front end is pivoted at 27 to the A-frame 22 directly above the main frame pivot 19.

The box-section beam 28 of the plow passes closely between the upper beam pivot plate 12 and the lower beam pivot plate 13, and is pivoted by a beam pivot 29 passing through these plates and a bush in the interposed beam, and welded to the upper plate 12. The beam is provided at the front with upper and lower brackets 30 engaging the top and bottom of the transverse arc 15, and it may be oscillated about its pivot 29 by a double-acting hydraulic cylinder 31 connected between a bracket 32 on the main frame and a bracket 33 on the beam.

The beam is fitted with a series of vertical bushes for oscillatable droppers 34 to the lower ends of which are adjustably secured hangers 35 for agricultural discs 36. A control arm 37 is secured to and extends radially from the top of each dropper 34. All the control arms are pivoted at their outer ends to a connecting rod 38. Secured above one of the control arms 37, and perpendicular to it, is a movable adjustment arm 39 of an elongated U-shape. A longitudinally slotted fixed adjustment arm 40 is mounted above the upper beam pivot plate 12 and extends forwardly therefrom. A roller 41 mounted rotatably above the fixed adjustment arm 40, and movable adjustably along this arm, is engaged in the U-shaped movable adjustment arm 39.

As the beam 28 is swung to one side or the other by the hydraulic cylinder 31, the droppers 34 and the discs 36 will be swung in appropriate manner. The breast cut of the discs may be adjusted, as and when required, by varying the position of the roller 41 on the fixed adjustment arm 40.

Between the rearmost and the next one of the droppers 34, the beam 28 passes closely between similar upper and lower pivot plates 42 and 43 of a back wheel carrier frame 44. Welded to the lower carrier pivot plate 43 and bolted to the upper plate 42 are the front ends of a pair of rearwardly divergent side members 45, their rear parts being welded between a pair of upper and lower arcuate plates 46. The beam 28 is pivoted at 47 between the upper and lower carrier pivot plates 42 and 43, and the rear end of the beam is closely slidable between the upper and lower arcuate plates 46. Connecting rods 48 connect corresponding positions on the lower carrier pivot plate 43 and the lower beam pivot plate 13 so that, when the beam 28 is swung to one side or the other, the back wheel carrier frame 44 is moved in parallelism. This frame includes a rearwardly and downwardly inclining fork 49 in which the back or furrow wheel 50 is carried, the fork being adjustable for effective length so that the operating depth of the plow can be adjusted.

If, when the plow is in use, one of the discs 36 should strike a stump, large stone or other obstacle, the main frame will yield pivotally against the action of the compression springs 20 so that instead of the plow being subjected to a sudden severe stress, the shock will be largely absorbed by the springs, and the plow will ride over the obstacle without strain or damage. As the back wheel carrier frame 44 is supported not only by its pivotal connection 47 to the beam 28, as is the case with a conventional reversible plow, but also by the close engagement of the upper and lower arcuate plates 46 with the rear end of the beam, the stresses and wear at the connection of the carrier frame and the beam will be very materially reduced.

What I claim is:

1. A reversible multi-disc plow comprising:
(a) a main frame,
(b) means for mounting said main frame at its front end to a three point lifting system of a tractor, said mounting means comprising a mounting frame including a transverse pivot box and a transverse front pivot bar passing through and centrally pivotally mounted to said pivot box about a vertical axis, said pivot bar being secured at its opposite ends to said main frame, whereby said main frame is mounted for pivotal movement relative to said mounting means about a substantially vertical axis,
(c) a beam pivoted to said main frame about a substantially vertical axis,
(d) means for swinging said beam to right and left hand plowing positions,
(e) a furrow wheel operatively connected to the rear of said beam,
(f) a plurality of hangers operatively connected to said beam and carrying plow discs,
(g) means for simultaneously pivoting said hangers relative to said beam when said beam is swung to either of its positions, and
(h) spring means adapted to resist pivotal movement of said frame relative to said mounting means, said spring means comprising compression springs mounted on said pivot box and bearing against said pivot bar on the front and back surfaces thereof and to both sides of the pivotal connection of said pivot bar to said pivot box.

2. The plow of claim 1 wherein said main frame further includes a transverse arc member secured at its ends to side members of said frame, and having a connecting piece extending through an opening in said pivot box and secured to said pivot bar.

3. The plow of claim 1 wherein said means for pivoting said hangers relative to said beam comprises a control arm secured to an oscillatable dropper member for each hanger extending through said beam, and a connecting rod to which said control arms are pivotally secured, said dropper members, and thus said hangers and discs, oscillating when said beam is swung.

4. The plow according to claims 1, 2 or 3 wherein said furrow wheel is mounted at the rear of a carrier frame pivoted about a substantially vertical axis to the beam forwardly of the rear end thereof said rear end of said beam being laterally slidably engaged between upper and lower guides on said carrier frame, and means for maintaining the carrier frame in parallelism as the beam is swung to either of said positions.

* * * * *